United States Patent [19]
Richter

[11] Patent Number: 5,084,189
[45] Date of Patent: Jan. 28, 1992

[54] METHOD AND APPARATUS FOR SEPARATING FLUIDS HAVING DIFFERENT SPECIFIC GRAVITIES

[75] Inventor: Harvey E. Richter, N. Palm Beach, Fla.

[73] Assignee: Richter Systems, Inc., North Palm Beach, Fla.

[21] Appl. No.: 585,943

[22] Filed: Sep. 21, 1990

[51] Int. Cl.$^5$ .............................................. C02F 1/00
[52] U.S. Cl. .................... 210/789; 210/512.1; 210/512.3; 210/787; 210/258; 210/242.3; 209/149; 209/211; 55/52; 55/55; 55/189; 55/190; 55/191; 55/198; 55/398; 494/38; 494/40; 494/53; 494/54; 415/169.1; 415/124.1; 417/247; 417/423.1; 417/423.4; 277/34; 251/145; 251/340; 251/343; 251/353; 138/44; 138/155; 137/271
[58] Field of Search ............... 210/512.1, 512.3, 787, 210/789, 258, 242.3; 494/53, 54, 38, 40; 55/52, 55, 189, 190, 298, 191, 198; 209/149, 211; 415/169.1, 124.16; 417/247, 423.1, 423.4; 277/34; 251/145, 340, 353, 343; 138/44, 155; 137/271

[56] References Cited

U.S. PATENT DOCUMENTS

| | | | |
|---|---|---|---|
| 3,083,893 | 4/1963 | Dean | 417/247 |
| 3,276,382 | 10/1966 | Richter | 417/247 |
| 3,517,821 | 6/1970 | Monson et al. | 210/512.1 |
| 3,786,996 | 1/1974 | Richter | 415/124.1 |
| 3,810,635 | 5/1974 | Richter | 277/34 |
| 4,478,712 | 10/1984 | Arnaudeau | 210/512.3 |
| 4,678,588 | 7/1987 | Shortt | 209/211 |
| 4,834,887 | 5/1984 | Broughton | 210/512.1 |

FOREIGN PATENT DOCUMENTS 1186412  1/1965  Fed. Rep. of Germany.
563186   5/1975  Switzerland.

Primary Examiner—Robert A. Dawson
Assistant Examiner—David Reifsnyder
Attorney, Agent, or Firm—Mason, Fenwick & Lawrence

[57] ABSTRACT

An axial flow-type pump for separating immiscible fluids having different specific gravities and a discharge manifold fluid connected to the fluid pump for drawing of the fluid having the heavier specific gravity. The fluid pump employs a rotatable impeller mechanism having a hollow core and a decreasing axial pitch in the direction of fluid flow. The fluid interface between the pump and the discharge manifold is adjustable, so that the discharge of the fluid having the heavier specific gravity can be adjusted. The fluids are introduced into the inlet end of the rotatable impeller to produce a high velocity swirling action in the fluids and a low pressure area along the longitudinal axis of the flow line, to generate a high centrifugal force as the fluids move axially and cause the fluid having the heavier specific gravity to migrate to the perimeter. The discharge manifold is then used to draw off the fluid having a heavier specific gravity.

18 Claims, 3 Drawing Sheets

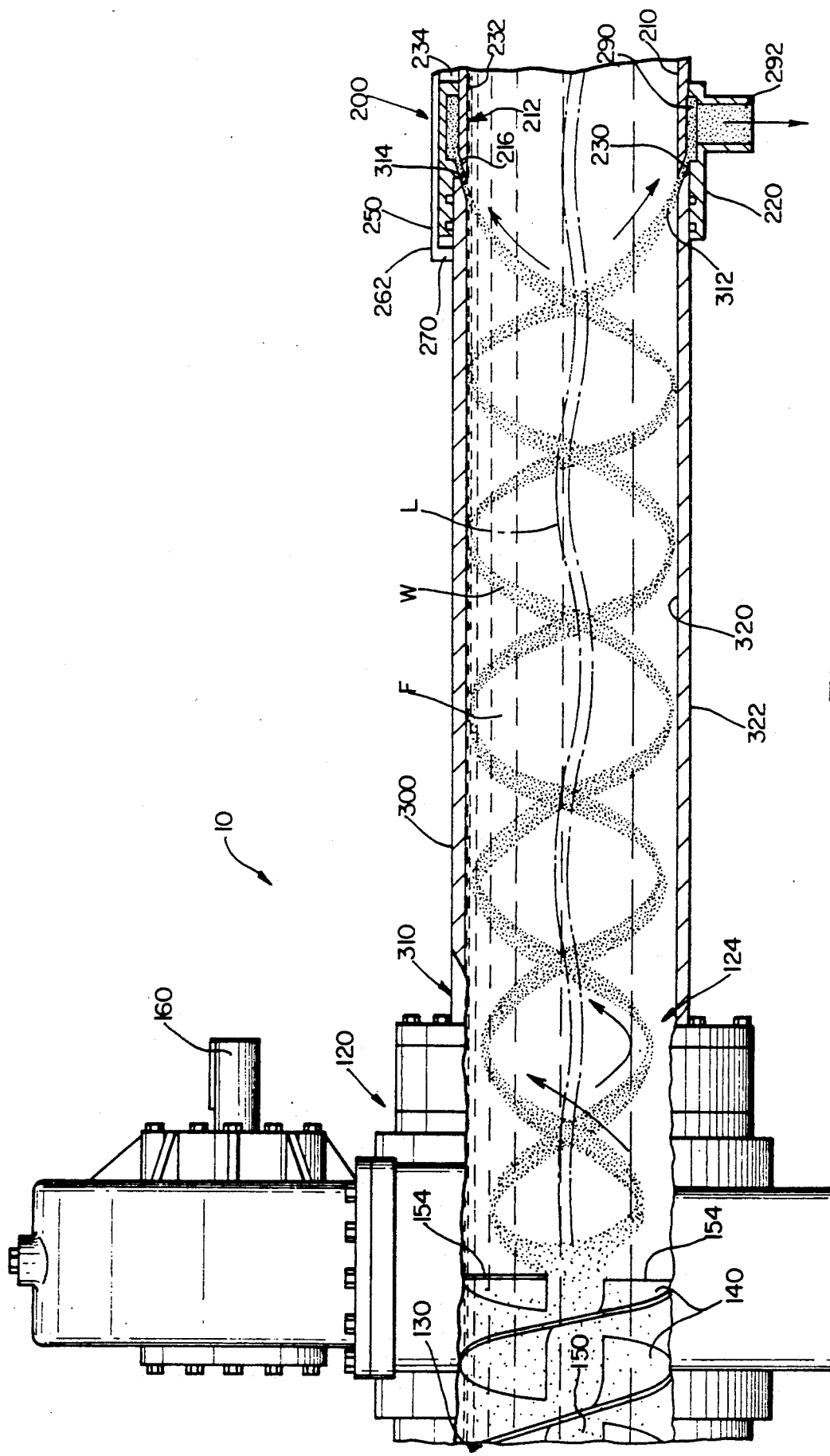

METHOD AND APPARATUS FOR SEPARATING FLUIDS HAVING DIFFERENT SPECIFIC GRAVITIES

FIELD OF THE INVENTION

The present invention is directed to a method and apparatus for separating fluids having different specific gravities, and is more specifically directed to fluid separators employing axial flow-type pumps.

BACKGROUND OF THE INVENTION

Millions of gallons of diesel fuel and jet fuel are transported by ships to various parts of the world for refueling of planes at sea and for delivery to ports. These transport ships contain many compartments for holding the diesel and jet fuel. While the fuels are in these compartments, they may become contaminated with water. However, fuel contaminated with water is unsuitable for use. Thus, at the point of delivery, any fuel contaminated with water will be rejected, and must be returned to the point from which it was shipped for refinement. The retransportation and refinement of the fuel is both costly and time consuming.

It is a purpose of my invention to provide a method and apparatus for separating fluids having different specific gravities, and more specifically, for separating water from an oil such as jet or diesel fuel, and which is adaptable for use in the removal of the contaminating water at the point of delivery.

Tubular centrifugal separators for the separation of immiscible fluids of different specific gravities are well know. These centrifugal separators employ a rotor carrying blades for rotating the mixture of fluids, causing the fluid having the lighter specific gravity to migrate to the center of the rotating mass, and the fluid having the heavier specific gravity to migrate to the perimeter, where it can be extracted. Examples of such centrifugal separators are disclosed in U.S. Pat. No. 4,478,712 to Arnaudeau, U.S. Pat. No. 3,517,821 to Monson et al., German patent No. 1,186,412 to Groppel, and Swiss patent No. 563,186 to Reynolds. Flow pumps and blowers built on the same general principle are disclosed in U.S. Pat. No. 1,071,042 to Fuller and U.S. Pat. No. 3,083,893 to Dean, respectively, and in my U.S. Pat. Nos. 3,276,382, 3,786,996, and 3,810,635.

However, none of these devices provides a sufficiently great G-force to create a well-defined boundary between the fluids as they separate under centrifugal force, e.g. by compressing the fluid having the lighter specific gravity to a tight core in the center of a tube of the fluid having the heavier specific gravity, whereby the fluid having the heavier specific gravity can be drawn off in a single pass without the need for additional treatment of the fluid having the lighter specific gravity. Further, none of these devices provides an adjustable mechanism for drawing off the fluid having the heavier specific gravity. It is the solution of these problems to which the present invention is directed.

SUMMARY OF THE INVENTION

Therefore, it is the primary object of this invention to provide a method and apparatus for separating immiscible fluids having different specific gravities which greatly increases the gravitational force acting on the fluids by accelerating the swirl velocity of the fluids and maintaining a high volume flow.

It is another object of this invention to provide a method and apparatus for separating immiscible fluids having different specific gravities at the point of delivery of the fluids.

It is still another object of this invention to provide a method and apparatus capable of separating immiscible fluids having different specific gravities with only one treatment stage.

The foregoing and other objects of the invention are achieved by provision of an axial flow-type pump for separating immiscible fluids having different specific gravities and a discharge manifold fluid connected to the fluid pump for drawing of the fluid having the heavier specific gravity. The fluid pump employs a rotatable impeller mechanism having a hollow core and a decreasing axial pitch in the direction of fluid flow. The fluid interface between the pump and the discharge manifold is adjustable, so that the discharge of the fluid having the heavier specific gravity can be adjusted.

The method according to the invention comprises introducing the fluids into the inlet end of a rotatable impeller in accordance with the invention, to produce a high velocity swirling action in the fluids and a low pressure area along the longitudinal axis of the flow line, to generate a high centrifugal force as the fluids move axially, thereby throwing the fluid having the heavier specific gravity to the perimeter, and using a discharge manifold in accordance with the invention to draw off the fluid having a heavier specific gravity.

A better understanding of the disclosed embodiments of the invention will be achieved when the accompanying detailed description is considered in conjunction with the appended drawings in which like reference numerals are used for the same parts as illustrated in the different figures.

BRIEF DESCRIPTION OF THE DRAWINGS

FIG. 5 is a partial cross-sectional view of the pump and discharge manifold of FIG. 1, showing the fluid vortex created by the pump and the manner in which the fluid having a heavier specific gravity is drawn off at the discharge manifold.

DESCRIPTION OF THE PREFERRED EMBODIMENTS

Figure 1:
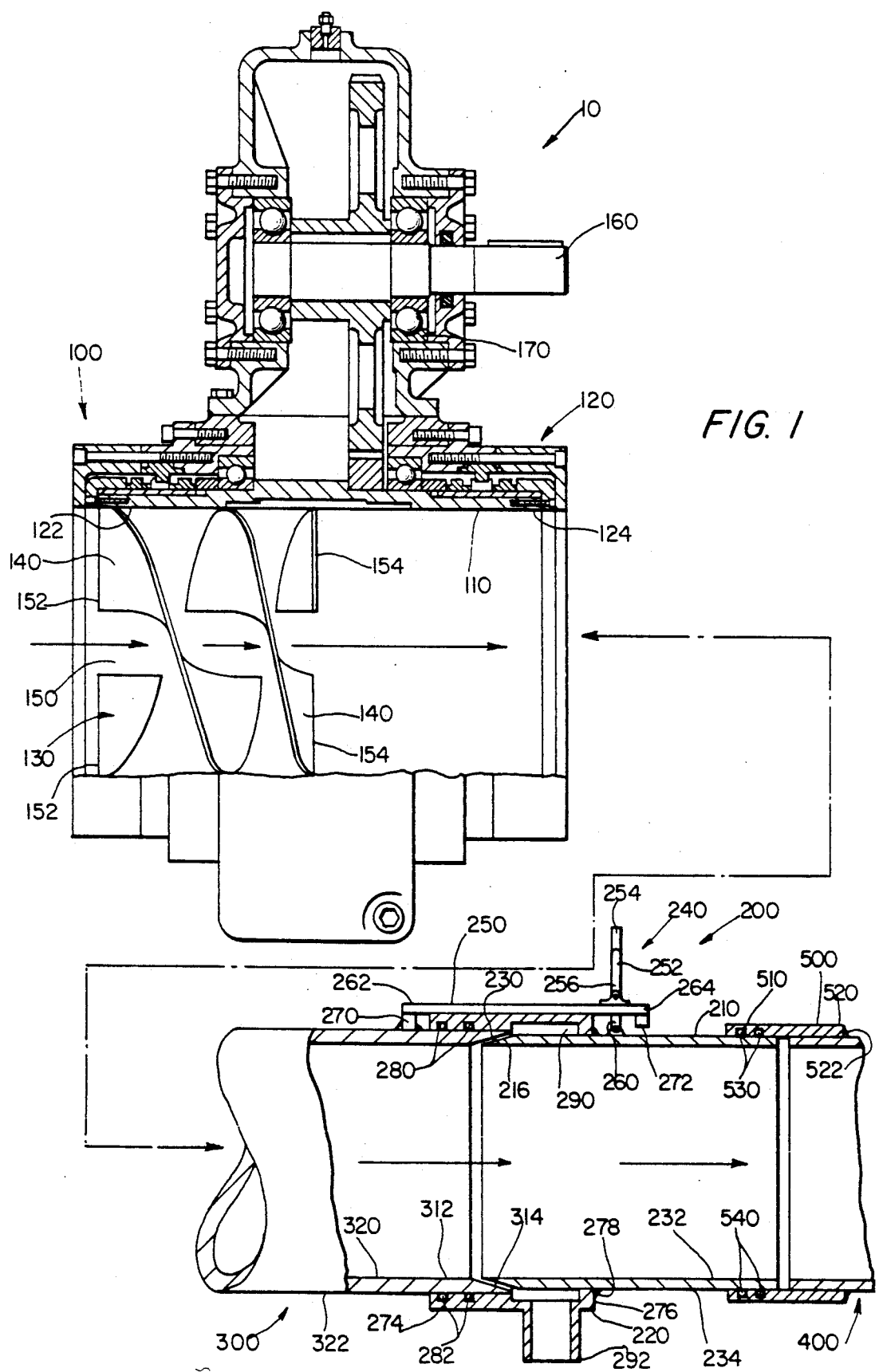
FIG. 1 is a cross-sectional view of a fluid axial flow type pump and discharge manifold in accordance with the present invention.
Figure 2:
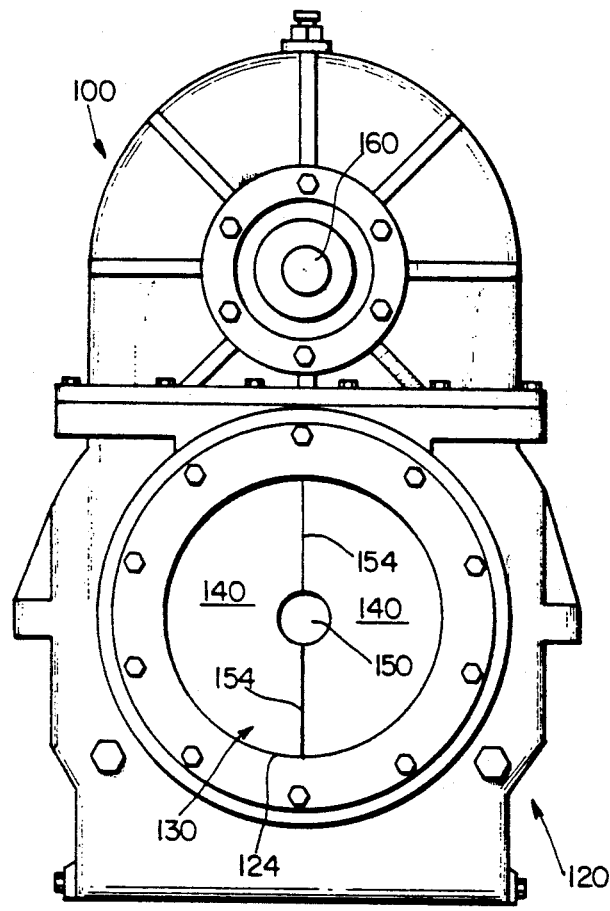
FIG. 2 is a rear elevational view of the pump of FIG. 1.
Figure 3:
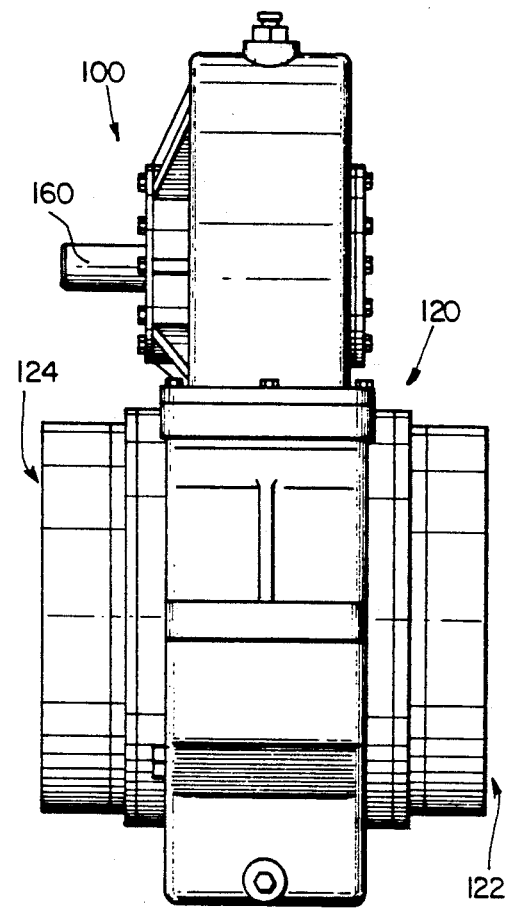
FIG. 3 is a right side elevational view of the pump of FIG. 1.
Figure 4:
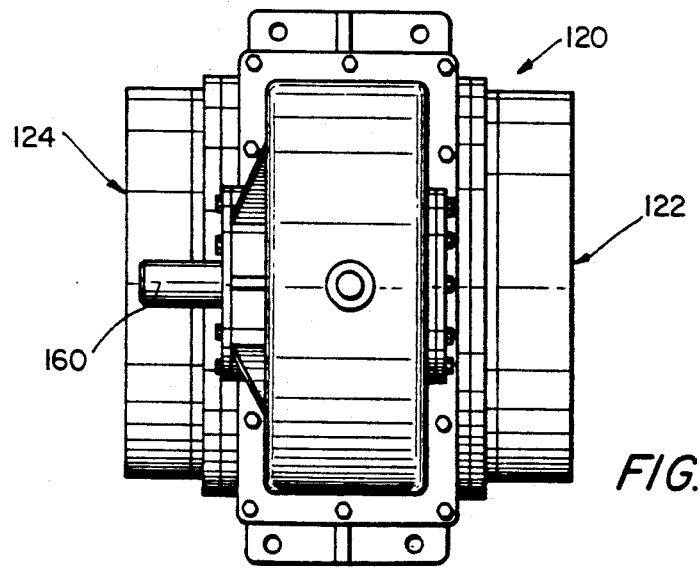
FIG. 4 is a top plan view of the pump of FIG. 1.

Referring now to FIGS. 1-5, there is illustrated an embodiment of apparatus for separating immiscible fluids having specific gravities in accordance with the invention, generally designated by the reference numeral 10.

Separator 10 comprises a fluid flow device 100 of the axial pump type, a discharge manifold 200, and an upstream discharge conduit 300 fluid connecting fluid flow device 100 and discharge manifold 200. Discharge manifold 200 can be fluid connected to a downstream discharge conduit 400 for carrying the fluid having the lighter specific gravity. As illustrated in FIG. 1, axial pump 100 comprises fluid passage means such as a rotatable cylindrical drum or conduit 110 mounted for rotation in a housing 120 and having an inlet 122 and an outlet 124. Drum 110 provides a passage-way for the fluids.

Drum 110 is provided with an impeller or rotor 130 comprising a pair of helical blades 140 formed integrally with drum 110 to rotate with drum 110. The use of two blades, rather than three or more, is preferred, two blades produce less turbulence and less surface resistance than three or more blades, yet can supply the same amount of volume as three or more blades, but with added swirl velocity.

Blades 140 extend radially inwardly short of the longitudinal axis of drum 110 to provide or define an axial hollow core or opening 150. As blades 140 rotate, core 150 will initiate a low pressure area in the center of the flow line, with the high velocity, higher specific gravity fluid on the outer perimeter, as shown with respect to water W in FIG. 5, to provide an inherent separation of the fluids. Where the lower specific gravity fluid comprises the primary fluid, and the higher specific gravity fluid comprises a small amount of fluid contaminant, for example in the case of fuel contaminated by water, the lower specific gravity fluid will occupy the whole flow line, as does fuel F in FIG. 5. However, where the higher specific gravity fluid comprises the primary fluid, the lower specific gravity fluid will migrate to the center by the low pressure generated by hollow core 150, as shown in dotted lines designated L, again providing an inherent separation of the fluids.

Blades 140 have a higher axial pitch at their inlet ends 152 which is gradually reduced to a smaller axial pitch at their outlet ends 154. Preferably, blades 140 have an axial pitch of approximately ten inches at their inlet ends 152 and an axial pitch of approximately five inches at their outlet ends 154. Although these axial pitches will provide the desired volume and swirl velocity, they can be varied without departing from the spirit of the invention.

Blades 140 will supply a flow volume of ten inch axial pitch, and as the helical pitch reduces to five inches, the swirl velocity increases greatly to provide a tight swirling axial movement of the fluids. With the reduction in pitch of blades 140, the swirl velocity and the centrifugal force are both doubled in comparison to blades of uniform pitch. Blades 140 produce approximately 672 G's, in comparison with three blades of uniform pitch, which produce approximately 336 G's.

Because of their configuration, each of blades 140 is in contact with the fluids for a complete revolution. Continuous contact with the fluids for one complete revolution is necessary to change the swirl velocity and provide a smooth transition from low to high centrifugal action. Blades 140 also create less turbulence than, for example, three or more short impeller blades would. This is a great advantage when one of the fluids is oil or another liquid which is easily emulsified, as the reduced turbulence will prevent emulsification.

Axial pumps such as pump 100 are normally powered and require a suitable power source such as a motor (not shown) for rotating an input shaft 160 drivingly connected to gearing 170. Suitable bearing means 180 must be employed for axially positioning and rotatably supporting drum 110 within housing 120. A detailed description of the structure associated with the drive mechanism for pump 100 can be found in my U.S. Pat. Nos. 3,786,996 and 3,810,635, which are specifically incorporated herein by reference, and made a part hereof as though reproduced herein, with respect to their descriptions of the structure associated with the drive mechanism for a pump.

Upstream discharge conduit 300 has an inlet end 310 and an outlet end 312. Inlet end 310 can be fluid connected by conventional means to the tank or other container holding the fluids to be separated, at the point of delivery of the fluids. Drum 110 is conventionally fluid connected at its outlet end 154 to the inlet end 310 of upstream discharge conduit 300. Outlet end 312 tapers outwardly, that is, its outer edge 314 tapers outwardly in the downstream direction from the inner surface 320 to the outer surface 322 of upstream discharge conduit 300, for a purpose to be described hereinafter. The angle of the taper, that is, the angle between edge 314 and outer surface 322 preferably is approximately 12°, to obtain optimum results.

Discharge manifold 200 comprises an axially movable conduit section 210 having substantially the same inner diameter as drum 110, and having an inlet end 212 and an outlet end 214. An upstream sealing ring 220 is affixed to conduit section 210 for sealingly connecting conduit section 210 at its inlet end 212 to the outlet end 312 of upstream discharge conduit 300, and permitting relative axial movement of conduit section 210 and upstream discharge conduit 300.

Inlet end 212 tapers outwardly, i.e., its outer edge 230 tapers outwardly in a downstream direction from the inner surface 232 to the outer surface 234 of conduit section 210 for mating engagement with tapered outer edge 314 of upstream discharge conduit 300. For this purpose, the angle formed between outer edge 230 and inner surface 232 of conduit section 210 is substantially the same as the angle formed between outer edge 314 and outer surface 322 of upstream discharge conduit 300.

An adjustment assembly 240 is provided for moving conduit section 210 into and out of engagement with outlet end 312 of upstream discharge conduit 300 for respectively closing and opening discharge manifold 200.

Adjustment assembly 240 comprises a platform 250 extending over upstream sealing ring 220 and fixed to discharge manifold 200 upstream of outlet end 312 of upstream sealing ring 220. An operating handle 252 is provided for operating discharge manifold 200. Handle 252 has a distal end 254 extending outwardly from platform 250 and a proximal end 256 by which it is pivotally mounted to platform 250. A link 260 is pivotally mounted at one end to moveable conduit section 210 and pivotally mounted at the other end to proximal end 256 of handle 250 through a slot (not shown) in platform 250. As handle 252 is pivoted, its motion is transmitted to movable conduit section 210 through link 260. Thus, when handle 252 is pivoted towards upstream discharge conduit 300, movable conduit section 210 moves away from upstream discharge conduit 300 to open discharge manifold 200; and when handle 252 is rotated away from upstream discharge conduit 300, movable conduit section 210 moves away from upstream discharge conduit 300 to close discharge manifold 200, and upstream discharge conduit 300 Movable conduit section 210 can be fully engaged, fully disengaged, or any position in between, depending upon the amount handle 252 is rotated. A gauge (not shown) can be provided on platform 250 (e.g. at the slot) to indicate by the position of handle 252 what percentage discharge manifold 200 is open.

Platform 250 has an upstream end 262 and a downstream end 264. A first block 270 joins upstream end 262 to upstream discharge conduit 300 and also acts as a stop for discharge manifold 200 in it full closed position. A second block 272 extends downwardly from downstream end 264 of platform 250 and acts as a stop for discharge manifold 200 in the full open position.

Upstream sealing ring 220 has an upstream end 274 and a downstream end 276. Upstream end 274 slidably engages outlet end 312 of upstream discharge conduit 300. Downstream end 276 is fixed to inlet end 212 of moveable 10 conduit section 210 upstream of link 260, e.g., by a weld 278.

A pair of O-ring seals 280 is provided in a pair of circumferential channels 282 formed in upstream sealing ring 220 adjacent its upstream end 274 to provide a fluid seal between upstream sealing ring 220 and upstream discharge conduit 300 as upstream end 274 of upstream sealing ring 220 slides relative to outlet end 312 of upstream discharge conduit 300. A circumferential discharge channel 290 is provided in upstream sealing ring 220 at its downstream end 276 immediately adjacent the termination of the taper in edge 314 of upstream discharge conduit 300 to receive the fluid of lighter specific gravity circulating adjacent inner surface 320 of upstream discharge conduit 300 when discharge manifold 200 is open. A discharge port 292 opens into discharge channel 290 for receiving and discharging water from discharge channel 290.

Movable conduit section 210 is sealingly connected at its outlet end 214 to downstream discharge conduit 400 by a downstream sealing ring 500. Downstream sealing ring 500 has an upstream end 510 which slidingly engages outlet end 214 of movable conduit section 210, and a downstream end 520 which is fixed to inlet end 410 of downstream discharge conduit 400, e.g., by a weld 522.

A pair of O-ring seals 530 is provided in a pair of circumferential channels 540 formed in upstream end 510 of downstream sealing ring 500 to provide a fluid seal between downstream sealing ring 500 and movable conduit section 210 as upstream end 510 of downstream sealing ring 500 slides relative to outlet end 214 of movable conduit section 210.

Referring now to FIGS. 1 and 5, the operation of the invention will now be described with reference of the delivery of diesel or jet fuel from a transport ship, which fuel has been contaminated by sea water. However, it should be understood that application of the invention is not limited to the separation of water and fuel or to use in the context of fuel transport ships, but can be used for the separation of any two fluids having different specific gravities, e.g. oil and water where water is the primary fluid, sludge and treated water in a water purification system, or in reverse osmosis.

In operation, the fluids in their unseparated state are fed into inlet 122 of drum 110 using conventional means. As blades 140 rotate, the water W (which has a heavier specific gravity) swirls in a vortex adjacent the inner surface 320 of upstream discharge conduit 300. The fuel F, as the primary fluid, occupies the entire flow line. It is noted that, if the water W were the primary fluid, the water W would still migrate to the perimeter, but the low pressure initiated by hollow core 150 would cause the fuel F (which has a lighter specific gravity) to be compressed into a tight core around the axis of upstream discharge conduit 300, as shown in dotted lines in FIG. 5. However, if the water W were the primary fluid, then discharge manifold 200 would be replaced by a different discharge manifold, which does not constitute a part of this invention.

With discharge manifold 200 in the full open position as shown in FIG. 5, the water W will flow between edge 314 of upstream discharge conduit 300 and edge 216 of movable conduit section 210 into discharge channel 290, and out through discharge port 292. The fuel F, separated from the water W, will continue to flow through discharge manifold 200 and out through downstream discharge conduit 400 to its destination.

Thus, it will be seen that the present invention provides a unique method for separating immiscible fluids having different specific gravities. While a preferred embodiment of the invention has been disclosed, it should be understood that the spirit and scope of the invention are to be limited solely by the appended claims, since numerous modifications of the disclosed embodiment will undoubtedly occur to those of skill in the art.

What is claimed is:

1. Apparatus for separating a fluid having a lighter specific gravity from a fluid having a heavier specific gravity comprising:
   fluid passage means for receiving the fluids to be separated and having an inlet and an outlet and a longitudinal axis;
   a discharge conduit connected to said outlet;
   rotatable impeller means positioned in said fluid passage means for imparting a swirling axial movement to the fluids in said fluid passage means downstream of said impeller means and in said discharge conduit and causing the fluid having the heavier specific gravity to migrate outwardly; and
   discharge means connected to said discharge conduit for discharging the fluid having the lighter specific gravity separately from the fluid having the heavier specific gravity;
   said impeller means comprising at least two concentric helical blades each having an inlet end and an outlet end, said helical blades each having a greater axial pitch at said inlet end than at said outlet end, and said helical blades each terminating short of said longitudinal axis of said fluid passage means to define a hollow core through which the fluids pass.

2. The apparatus of claim 1, further comprising an axially rotatable drum, said fluid passage means forming part of said rotating drum, and said helical blades being integral with and extending from said fluid passage means, whereby said helical blades rotate with said rotating drum.

3. The apparatus of claim 1, wherein the axial pitch of each of said helical blades at said inlet end is approximately ten inches and the axial pitch of each of said helical blades at said outlet end is approximately five inches.

4. The apparatus of claim 1, said discharge means comprising an axially movable conduit section having substantially the same inner diameter as said drum, sealing ring means affixed to said conduit section for sealingly connecting said conduit section to said discharge conduit and permitting relative axial movement of said conduit section and said discharge conduit, said sealing means including a circumferential discharge channel, and adjustment means for moving said conduit section into and out of engagement with said discharge conduit for respectively closing and opening said discharge channel.

5. The apparatus of claim 1, wherein the number of said blades is two.

6. Fluid flow apparatus comprising:
an axially rotatable drum having an inlet and an outlet and a longitudinal axis; and
impeller means positioned in said rotating drum for imparting a swirling axial movement to fluids downstream of said impeller means, said impeller means comprising at least two concentric helical blades integral with and extending inwardly from said rotating drum, whereby said helical blades rotate with said rotating drum, said helical blades each having an inlet end and an outlet end, said helical blades each having a greater axial pitch at said inlet end than at said outlet end, and said helical blades each terminating short of said longitudinal axis of said fluid passage means to define a hollow core.

7. The apparatus of claim 6, wherein the number of said blades is two.

8. The apparatus of claim 6, wherein the axial pitch of said helical blades at said inlet end is approximately ten inches and the axial pitch of said helical blades at said outlet end is approximately five inches.

9. A method of separating a fluid having a lighter specific gravity from a fluid having a heavier specific gravity comprising:
providing fluid passage means for receiving the fluids to be separated, the fluid passage means having an inlet and an outlet and a longitudinal axis;
providing in the fluid passage means a rotatable impeller comprising at least two concentric helical blades each having an inlet end and an outlet end, the helical blades each having a greater axial pitch at the inlet end than at the outlet end, and the helical blades each terminating short of the longitudinal axis of the fluid passage means to define a hollow core through which the fluids pass;
introducing the fluids into the inlet end of the fluid passage means;
producing a high velocity swirling action in the fluids in the fluid passage means by rotating the impeller, to generate a high centrifugal force as the fluids move axially, while simultaneously creating a low pressure area for the fluid having the lighter specific gravity along the longitudinal axis of the fluid passage means, to cause the fluid having the heavier specific gravity to migrate to the perimeter of the fluid passage means; and
drawing off the fluid having the heavier specific gravity.

10. The method of claim 9, wherein in said producing step, the swirling action increases from the inlet to the outlet of the fluid passage means.

11. The method of claim 9, further comprising the steps of:
providing a discharge conduit connected to the outlet of the fluid passage means;
providing a conduit section having a first end and a second end, the conduit section being axially movable with respect to the fluid conduit; and
providing sealing ring means affixed to the first end of the conduit section for sealingly connecting the first end of the conduit section to the second end of the fluid conduit and permitting relative axial movement of the conduit section and the fluid conduit, the sealing ring means including a circumferential discharge channel; and
wherein the drawing off step comprises moving the first end of the conduit section out of engagement with the second end of the fluid conduit to open the discharge channel.

12. An adjustable manifold for discharging fluid from a fluid conduit having a first end and a second end, said manifold comprising:
an axially movable conduit section having a first end and a second end and having substantially the same inner diameter as the fluid conduit;
sealing ring means affixed to said first end of said conduit section for sealingly connecting said first end of said conduit section to the second end of the fluid conduit and permitting relative axial movement of said conduit section and the fluid conduit, said sealing ring means including a circumferential discharge channel; and
adjustment means for moving said first end of said conduit section into and out of engagement with the second end of the fluid conduit for respectively closing and opening said discharge channel, wherein said adjustment means comprises:
a platform extending over said sealing ring means and having a first end affixed to the fluid conduit adjacent the second end of the fluid conduit and a second end positioned above said conduit section adjacent said first end of said conduit section;
a link having a first end pivotally mounted to said conduit section adjacent said first end of said conduit section and a second end pivotally mounted to said second end of said platform; and
handle means pivotally connected to said second end of said link for transmitting motion to said conduit section through said link.

13. The manifold of claim 12, wherein the second end of the fluid conduit is tapered inwardly, and wherein said first end of said conduit section is tapered outwardly for mating engagement with the second end of the fluid conduit.

14. The manifold of claim 13, wherein said circumferential discharge channel in said sealing ring means is adjacent said first end of said conduit section and wherein said sealing ring means further comprises a discharge port opening into said discharge channel.

15. The manifold of claim 12, wherein said circumferential discharge channel in said sealing ring means is adjacent said first end of said conduit section and wherein said sealing ring means further comprises a discharge port opening into said discharge channel.

16. The manifold of claim 12, further comprising stop means for blocking relative axial movement of said conduit section and the fluid conduit towards each other when said first end of said conduit section is fully in engagement with the second end of the fluid conduit.

17. The manifold of claim 12, further comprising stop means for blocking relative axial movement of said conduit section and the fluid conduit away from each other when said first end of said conduit section is fully out of engagement with the second end of the fluid conduit.

18. The manifold of claim 12, wherein said sealing ring means slidably engages the second end of the fluid conduit.

* * * * *